United States Patent

[11] 3,629,726

[72] Inventor Gabriel Popescu
Queens, N.Y.
[21] Appl. No. 854,240
[22] Filed Aug. 29, 1969
[45] Patented Dec. 21, 1971
[73] Assignee Surgical Design Corp.
Long Island City, N.Y.

[54] OSCILLATOR AND OSCILLATOR CONTROL CIRCUIT

11 Claims, 5 Drawing Figs.

[52] U.S. Cl. .......... 331/116 M, 310/8.1, 310/26, 331/109, 331/157, 331/186
[51] Int. Cl. .......... H03b 5/40
[50] Field of Search .......... 331/116, 157, 164, 109, 186; 310/8.1, 26

[56] References Cited
UNITED STATES PATENTS
3,199,052 8/1965 Verstraelen .......... 331/116
3,387,228 6/1968 Randall .......... 331/186

*Primary Examiner*—John Kominski
*Attorney*—Darby & Darby

ABSTRACT: An oscillator circuit adapted particularly for use with transducers for producing energy in the ultrasonic frequency range in which a combination of feedback signals representative of the voltage across the transducer and the current through the transducer are used to more precisely lock the oscillator to the resonant frequency of the load to thereby provide improved power transfer from the oscillator to the transducer. A current control circuit is also provided to control the amount of shock delivered by the transducer.

INVENTOR.
GABRIEL POPESCU

BY Darby & Darby

ATTORNEYS

INVENTOR.
GABRIEL POPESCU
BY Darby & Darby
ATTORNEYS

INVENTOR.
GABRIEL POPESCU
BY Darby & Darby
ATTORNEYS

OSCILLATOR AND OSCILLATOR CONTROL CIRCUIT

The use of ultrasonic energy is quite common in medical equipment as well as in general commercial applications such as ultrasonic cleaning. In these various applications a transducer is provided which operates from a source of energy, or generator, which is quite commonly an oscillator circuit. Common forms of transducers are of the piezoelectric or magnetostrictive type.

In the most commonly used form of magnetostrictive transducer, a stack of magnetostrictive elements are used which can be of any suitable material. The elements are selected to have a predetermined resonant frequency and are connected together in a manner so that their outputs will be additive in phase to produce a desired power output at or near the resonant frequency. The magnetostrictive elements are supplied with the necessary driving current through a single-wound inductance coil, or several such driving coils are used. When the transducer is operated with a load, the net effect is to change the input impedance of the transducer from that at resonance. Thus, in order to provide maximum power transfer to the transducer, the output characteristics of the oscillator must be shifted in a corresponding manner to compensate for this change in input impedance. It is desired that the oscillator be locked to the resonant frequency of the transducer and automatically change its output frequency under varying load conditions so that maximum power can be delivered to the load.

In prior art generators for ultrasonic transducers, a circuit known as the Clapp oscillator is commonly used. This circuit has the characteristic that the oscillator frequency will lock itself with a relatively good degree of precision with the resonant frequency of the stack of piezoelectric transducer elements forming the stack of the transducer. However, such an oscillator has the disadvantage that the power delivered to the stack is relatively small. One modification proposed to the Clapp-type oscillator circuit when used with the magnetostrictive transducers which provides a more effective power transfer between the oscillator and the transducer, uses a two-coil arrangement for the transducer. In this arrangement, one coil serves to receive power from the oscillator and the second provides a feedback voltage for oscillator control. While this two-coil transducer arrangement can increase the power transfer to some extent, it is more expensive and cumbersome in applications than a single-coil transducer.

The present invention is directed to an oscillator circuit for use with the ultrasonic transducer and particularly those of the single-coil magnetostrictive type. The oscillator circuit is connected to the transducer to receive feedback signals which are representative of both the voltage across and the current through the transducer coil. These two feedback signals are combined and provide an accurate locking of the oscillator frequency to the resonant frequency of the transducer, which frequency can be changing somewhat under varying load conditions. The oscillator of the present invention has been found to be capable of providing good power transfer over a relatively wide range of frequency, for example, over the range of 100 Hz. to 500 kHz.

In accordance with the invention, a circuit is also provided for controlling the amount of current supplied to the generator. This control circuit is in the form of a voltage comparator type circuit which keeps the current output of the generator substantially constant. This, in turn, tends to maintain a more constant stroke for the transducer, the stroke being proportional to the current.

It is therefore an object of the present invention to provide a generator for use with the ultrasonic transducer.

A further object is to provide an oscillator circuit for use with an ultrasonic transducer in which the circuit operates on two feedback signals which are proportional to the current through and the voltage across the transducer.

Another object is to provide a control circuit for an ultrasonic generator in which the output current of the generator is kept relatively constant over a fairly wide range by controlling the power to the generator.

Other objects and advantages of the present invention will become more apparent upon reference to the following specification and annexed drawings in which.

Figure 1:
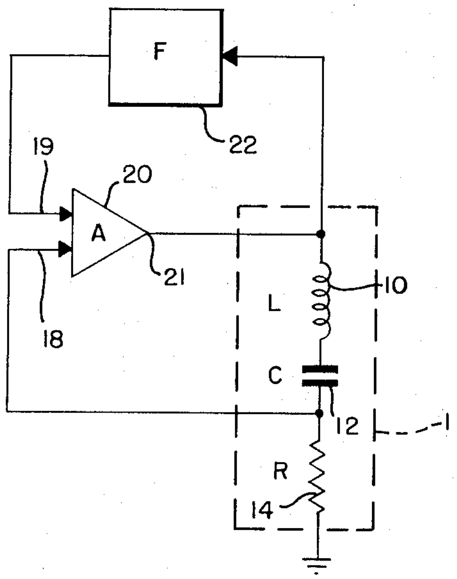
FIG. 1 is a diagram which illustrates the general principles of the generator.

FIG. 1 illustrates in simplified form a power generator circuit for an ultrasonic transducer which is capable of transferring power in a relatively efficient manner, and which is also capable of operating over a relatively wide range of frequencies. In FIG. 1 the transducer is represented by the reference numeral 1 and is illustratively of the magnetostrictive stack type operated by a driving coil (not shown). The transducer can be represented by a series connection of inductance, capacitance and resistance elements comprising an inductance 10, a capacitor 12 and a resistance 14. The respective values of L, C and R shown are values at the resonance frequency of the transducer.

The lower end of the resistance 14 is connected to the circuit common potential point and an amplifier 20 is provided. The output at terminal 21 of the amplifier 20 is connected to the transducer at the upper terminal of the inductance 10 of the series circuit representing the transducer. The inputs to the amplifier 20, designated by terminals 18 and 19, are two feedback signals, one from the junction of the capacitor 12 and the resistance 14, and the other at the upper terminal of the inductance 10.

In FIG. 1 the block 22, labeled F, represents a path for a voltage feedback signal which is applied to amplifier input terminal 19. The voltage supplied via the feedback element 22 is the voltage across the entire transducer 1. There are any suitable components provided in the feedback 22 to control the magnitude and phasing of the feedback voltage. The voltage across resistor 14 and applied to amplifier input terminal 18 corresponds to the current through the transducer 1, since resistance R is the resonance impedance of the transducer. The total feedback signal applied to the amplifier 20 is the difference between the voltage across the transducer (at terminal 19) and the current through the transducer (at terminal 18).

In theory, the circuit shown in FIG. 1 would operate to produce optimum power transfer between the generator and the transducer, since proper phasing control of the oscillator is available due to the feedback signals. In practice the circuit is not possible to achieve since the resonance impedance R, shown by resistor 14, of the transducer, is not physically accessible.

Figure 2:
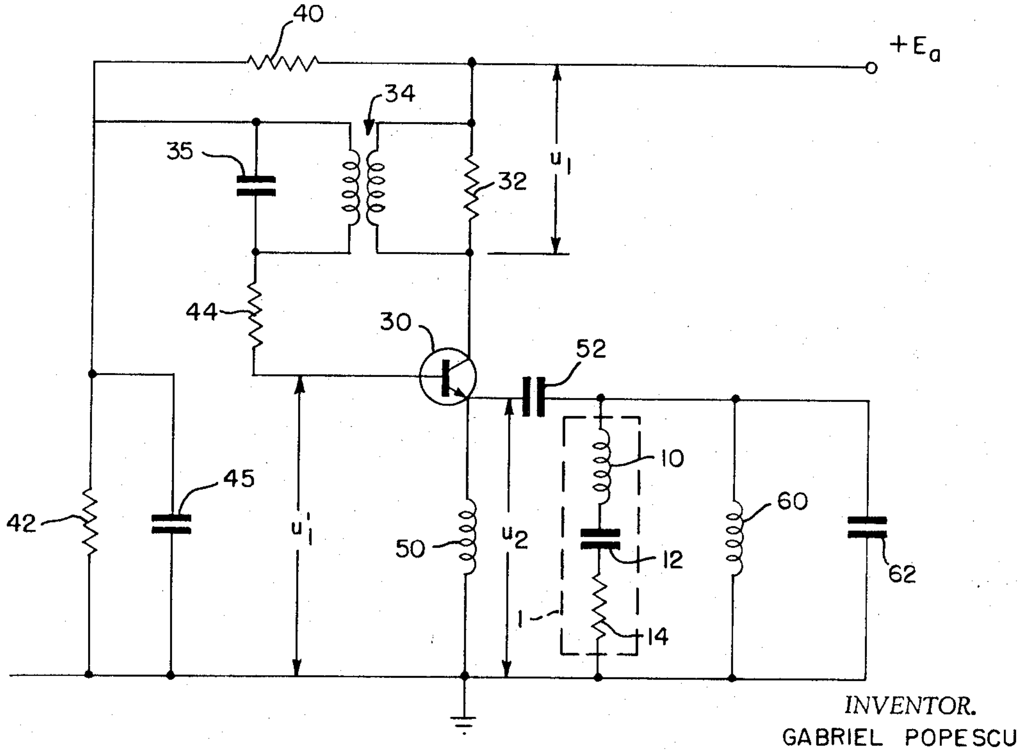
FIG. 2 is a schematic diagram of the generator.

FIG. 2 shows an improved oscillator circuit for use with an ultrasonic transducer in which a feedback voltage corresponding to the difference between the current through the transducer and the voltage across the transducer, is utilized. In the circuit of FIG. 2 the transducer 1 is again represented by the three series connected elements, the inductance 10, the capacitance 12 and the resistance 14, which are the respective impedances of the transducer at resonance. A transistor 30 is provided having the usual base emitter and collector electrodes. While an NPN-transistor is shown, it should be understood that a PNP-transistor could be used upon proper modification of the biasing voltages and polarities.

The collector of the transistor 30 is connected to a suitable source of potential $+E_a$ through a resistor 32. The secondary winding of the feedback transformer 34 is also connected between the collector and the voltage source. The base electrode of the transistor is biased through a voltage divider formed by the resistors 40 and 42, the DC resistance of the primary winding of transformer 34, and a resistor 44 which is connected between the lower end of the primary winding of transformer 34 around the base electrode. A capacitor 45 bypasses the base resistor 42. The primary winding of transformer 34 is part of a tuned circuit which is completed by the parallel connected capacitor 35. The resonant frequency of the tuned circuit 34, 35 and that of the secondary winding of transformer 34 at its inherent capacity, is selected at a frequency in the desired operating range. As is conventional in oscillator circuits, the lower Q of the frequency selective portion of the feedback circuit the wider will be the frequency range of operation of the circuit; since the feedback signal will be unaffected over a wider frequency range. Of course, low Q circuits are not as selective or as noise immune as higher Q circuits. Thus, a compromise is made as to the Q selected for the circuit. Also, the transformer 34 and resistors 40, 42, 44 are selected to produce the proper phase and amplitude feedback voltage.

The emitter circuit of the transistor includes a choke coil 50 connected between the emitter and the point of reference potential block a high-frequency path to ground. A capacitor 52 is connected between the emitter of the transistor and the upper end of the transducer 1. The lower end of the transducer is also connected to the point of reference potential. The single-wound driving coil of the transducer is represented by the inductance 60 and a capacitance 62 is shown connected in parallel with the coil to neutralize its inductance by tuning as a parallel resonance circuit.

The oscillator circuit FIG. 2 operates by having a collector to base feedback path through the transformer 34 which is phase inverted to produce a positive feedback signal and thereby sustain oscillations. The oscillator output voltage $u_1$ appears across the resistor 32 which is in the collector circuit of the amplifier. A portion of this output voltage is transformed by the tuned transformer 34 to provide a feedback voltage $u_1'$ by the which is applied through the resistor 44 to the transistor base electrode. Voltage $u_1$ is proportional to the current through the transducer 1 since the current passing through the transducer is effectively the same current (less the base current), passing through the transistor. This current appears across resistor 32 as the output voltage. The feedback voltage $u_1'$, which is proportional to the current through transducer 1, is applied between the base electrode of the transistor and the point of reference potential. This corresponds to the feedback signal applied to terminal 18 of amplifier 20 in the simplified circuit of FIG. 1.

The voltage across transducer 1 appears as a voltage $u_2$ across the inductor 50 in the transistor emitter circuit. This corresponds to the voltage applied to terminal 19 in the circuit of FIG. 1. This voltage is in phase opposition with the voltage $u_1'$ applied to the transistor base so that the effect of the two voltages $u_1'$ and $u_2$ with respect to driving the transistor is vectorially additive.

Figure 3A:
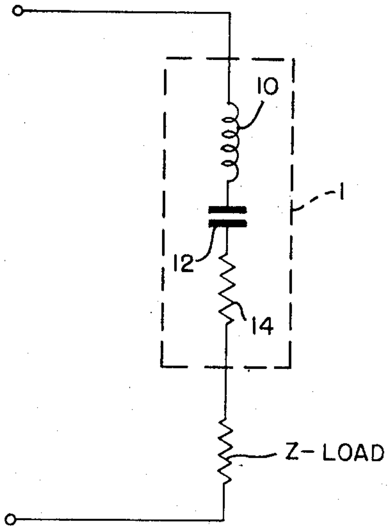
FIG. 3A is a schematic diagram illustrating certain operating principles of the transducer.
Figure 3:
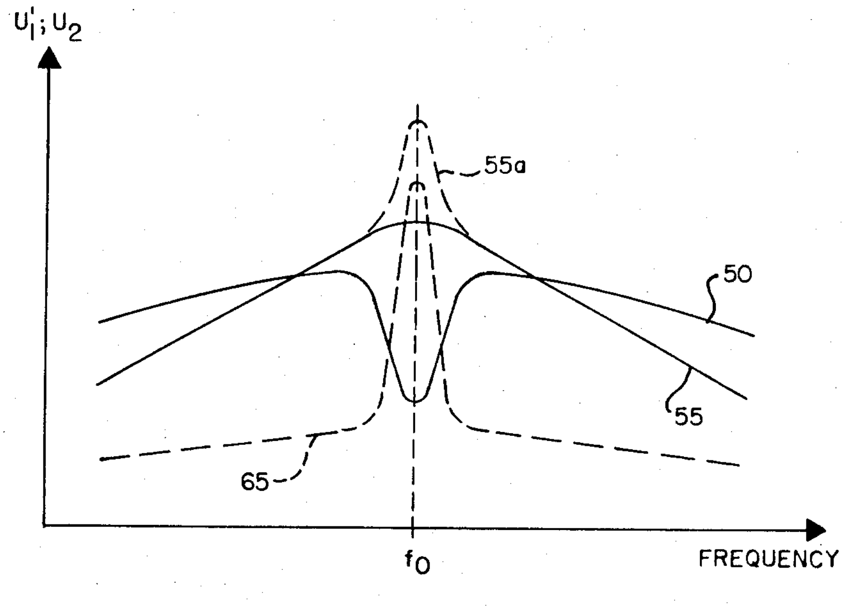
FIG. 3 is a diagram illustrating the effect of a load on the transducer.

FIG. 3 shows graphically the effect of the circuit of FIG. 2 on the transducer. The X-axis of the graph is in the frequency scale while the Y-axis is the amplitude scale for $u_1'$ and $u_2$. The voltage $u_1'$ is directly proportional to the oscillator output voltage $u_1$, as previously explained. In FIG. 3, the series resonant frequency of the transducer is designated $f_o$. Curve 50 is the voltage $u_2$ appearing at the emitter of the transistor 30. This voltage maintains a fairly level amplitude over a wide range of frequencies due to the presence of the transducer core 60 of value L and the neutralizing capacitor 62 of value C in parallel with the core. The voltage $u_2$ has a sharp dip around the resonance frequency $f_o$ which is produced by the mechanical resonance of the stack.

Curve 55 represents the voltage $u_1'$. The slowly changing amplitude portion on each side of the resonant frequency $f_o$ is due to the presence of the tuned feedback circuit transformer 34 and capacitor 35. This voltage peaks, as shown by the curve **55*a*, at the resonant frequency due to the presence of the stack transducer in the emitter circuit. The solid portion of the curve 55 below the peak 55*a*** indicates the voltage which would appear without the stacked transducer being in the emitter circuit. With the stacked transducer there is a resonance of the transducer which causes an additional peaking of the voltage at and on either side of the resonant frequency $f_o$.

Curve 65 is a combination of the two voltages $u_1'-u_2$. Here it can be seen that there is a peak voltage at the resonant frequency of the stack. In normal operation of the circuit, the resonant frequency of the stack will change somewhat, due to loading. The oscillator frequency will follow, within the limits of the circuit design to provide a feedback path to the base electrode. The circuit of the FIG. 2 is more effective than prior art circuits, since two feedback signals are used, one to the base and one to the emitter, both of which have peak values at the transducer stack resonant frequency. By choosing proper values of the circuit parameters, the amplifier will oscillate on the true resonant frequency of the transducer stack and will stay locked in on that frequency. Oscillators have been built which track over a fairly large range of frequencies in the overall range from 10 to 100 kHz.

The oscillator circuit of FIG. 2 will function substantially in a Class B manner. Accordingly, selecting the proper values for the feedback components for the transformer 34 and the capacitor 35 can be accomplished quite readily. However, the time constant of this tuned circuit, brought about by the resistance aspect, i.e., resistor 32 of the secondary of transformer 34, should not be neglected. Adequate feedback is necessary if good performance is to be achieved. Since the transistor 30 will operate Class B, somewhat pulsed, this requires a reasonable selection, that is a medium-sized value, for the collector resistor 40 to provide a more uniform load to the transformer 34 and the capacitor 35. Resistor 40 will also protect the transistor from undesired high peaks in the base current which might endanger the life of the transistor.

In ultrasonic transducers, it is desirable that the stroke of the transducer be kept relatively constant for varying loads. This is accomplished, in accordance with the present invention, by controlling the input power to the generator so that the generator will produce a relatively constant output current. The transducer stroke is proportional to the output current of the generator so that if the transducer current can be kept more constant under varying load conditions, its stroke also can be kept more constant.

In the transducer, the following relationship applies:

$$(1)\qquad \Delta L/L = f(H) = F(I)$$

where:

$L$ = the length of the magnetostrictive material of the transducer.

$\Delta L$ = the change in length of the magnetostrictive material (stroke).

$f$ and $F$ = functions.

$H$ = the magnetic field of the core driving the transducer.

$I$ = the current supplied to the core and the transducer.

As seen, to compensate for a change in $L$, the current $I$ can be changed, since $H$ is a function of $I$.

The effect of transducer loading is shown in FIG. 3A. Reference numeral 1 represents the transducer and its mechanical impedance components ($L$, $C$, $R$) 10, 12, 14. The load, designated $Z_{LOAD}$, when of the damping variety, is resistive. The effect of the driving coil inductance is neutralized by a parallel capacitor (both not shown). Since the circuit of FIG. 3A is of the series resonance type, for a high value $Z_{LOAD}$, the $Q$ of the transducer will decrease to values where the regular variations of the transducer impedance with frequency will be too small to control the oscillation of the generator. This is seen from the formula:

$$(2)\qquad \varphi = \arctan\left(\frac{\omega}{\omega_0} - \frac{\omega_0}{\omega}\right)Q = \arctan\left(\frac{\omega}{\omega_0} - \frac{\omega_0}{\omega}\right)\frac{\omega_0 L}{R + Z_{\mathrm{LOAD}}}$$

where:

$\Phi$ = the phase angle of the feedback voltage.

$\omega_o$ = the resonant frequency of the transducer.

$\omega$ = the operating frequency.

$Q$ = the quality factor of the transducer.

$L$ and $R$ = the values of the inductance and resistance of the transducer at resonance.

$Z_{LOAD}$ = the impedance of the load.

By keeping the current through the transducer constant, the power in he transducer will increase with increasing load. As is well known, the power $P$ delivered to a load represented by a resistance $R$, is equal to:

(3) $P=I^2R$

Thus, if the load increases causing an increase in $R$, the total power $P$ will increase if $I$ is held constant.

Figure 4:
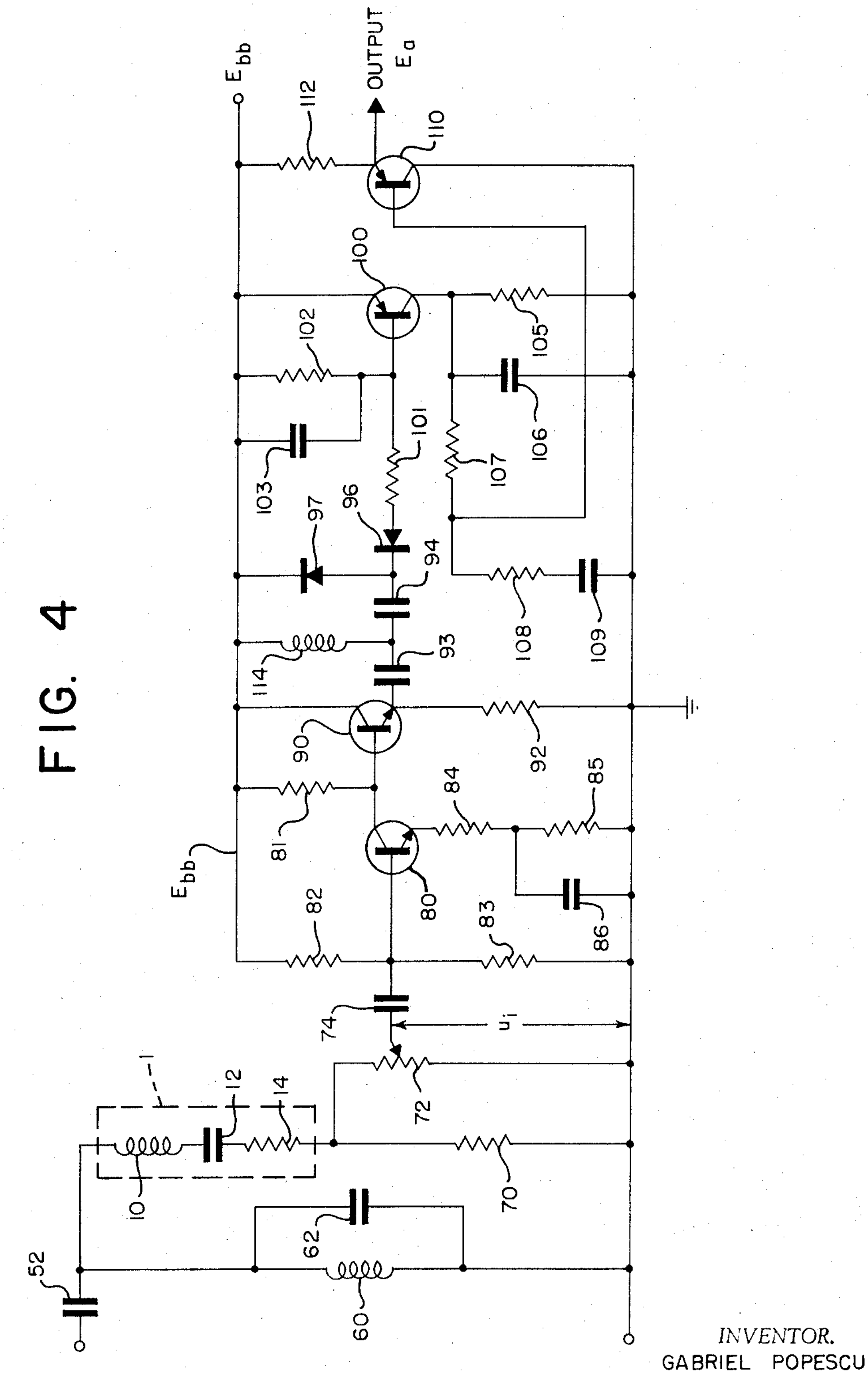
FIG. 4 is a schematic diagram of a circuit for keeping a relatively constant current supplied to the transducer.

Referring now to FIG. 4, there is shown a circuit for use with the generator of FIG. 2 to control its output stroke, keeping the current through the transducer 1 relatively constant. Those portions of the generator of FIG. 2 necessary to explain the operation of the circuit of FIG. 4, are shown with the same reference numerals.

As seen, a resistor 70 is connected in series with the transducer 10. The value of the resistor 70 is made sufficiently small so that there will be as small a $Q$ degradation as possible. An adjustable potentiometer 72 is shunted across the resistor 70 and a desired quantity of output voltage is tapped off the slider of the potentiometer. The voltage tapped off potentiometer 72 is an AC signal which is proportional to the current through the transducer. This signal is applied through a capacitor 74 to a two-stage, direct coupled, amplifier formed by transistors 80 and 90. The collector of transistor 80 is connected to a power supply voltage $E_{bb}$ through a resistor 81 which also supplies base bias for transistor 90. The collector of transistor 90 is connected directly to the power supply while the emitter is connected to the circuit reference potential point. The voltage value $E_{bb}$ is higher than the voltage $E_a$ used for the generator of FIG. 2. Transistor 80 is supplied base bias through resistors 82 and 83. The emitter is returned to the circuit common by resistors 84 and 85, the latter of which is shunted by a bypass capacitor 86. The collector of transistor 80 drives the base of resistor 70 directly.

The output from transistor 90 is taken across an emitter resistor 92 and applied through capacitors 93 and 94 to the input of a comparator transistor 100.

The gain of the two transistors 80 and 90 is selected so that there is a voltage at the emitter of transistor 90 of a magnitude greater than a predetermined reference level at any input voltage to the comparator circuit at the base of the transistor corresponding to the established power range. That is, over the frequency range where power to the transducer is to be kept relatively constant, power varying with frequency and load, the amplitude of the signal applied to the comparator transistor 100 must be equal to or greater than the reference level set by the transistor.

The reference level of the comparator transistor 100 in the circuit of FIG. 4 is the voltage drop inherent between the base and the emitter. In a typical conventional silicon transistor, this voltage drop is in the order of 0.6 volts. Other values of a reference level voltage can be selected by selection of the proper transistor. The use of the transistor to set the reference level is a simple, but fairly effective, way of accomplishing the voltage comparison. To obtain higher voltage values for the reference level, a Zener diode can be used which is inserted between the emitter of the transistor and the point of reference potential.

The AC signal at the output of transistor 90 is rectified by the back-to-back diode pair 96 and diode 97, which is connected between the $E_{bb}$ supply and the junction of capacitor 94 and the diodes 96. A resistor 101 connected to the diodes and an RC network of a parallel connected resistor 102 and a capacitor 103, serve as a filter. The DC voltage produced is applied to the base of the comparator transistor 100.

The emitter of comparator transistor 100 is connected directly to the $E_{bb}$ supply, while the collector is returned to the circuit common by a resistor 105 which is bypassed by a capacitor 106. The output signal of transistor 100 is applied through a resistor 107 to the base of a power control transistor 110. The power control transistor 110 has its collector connected to the circuit common point and its emitter connected to $E_{bb}$ through a resistor 112. At the lower end of resistor 112, a connection is made to the $E_a$ supply of the generator of FIG. 2.

Resistor 107 and the series connected resistor 108 and capacitor 109 provide the time constant necessary for the control circuit. These three elements comprise a low-pass filter between the comparator output at the collector of the comparator transistor 100 and the input to the power control transistor 110. This filter is selected to have suitable frequency-phase characteristics to obtain the desired transient response for the circuit.

In the operation of the circuit of FIG. 4, when the voltage applied to the base of transistor 100 exceeds the reference level set by the inherent base to emitter voltage drop, the transistor will conduct producing a signal across its collector resistor 105, which is applied to the base of transistor 110, causing it to conduct. Upon conduction of transistor 110, the emitter voltage drops, causing a drop in the value of $E_a$. This causes a drop in the magnitude of the output power of the oscillator circuit. Thus, as the current through the transducer 1, sensed by the resistor 70, increases above the desired level set by the transistor 100, the transistor 100 produces a larger output signal driving the control transistor 110 further into conduction and the $E_a$ voltage is reduced proportionately. The degree to which the control transistor 110 is driven toward saturation is dependent upon the magnitude of the voltage across resistor 70, which is in turn a function of the current through the transducer. Thus, the action of the circuit is to keep the current through the transducer to a fairly constant value by controlling the conduction of the transistor 110.

In the circuit of FIG. 4, the values of capacitors 74, 86 and 93 and a choke coil 114 connected between $E_{bb}$ and the junction of diodes 96 and the capacitor 94 are selected to minimize the effect of 60 Hz. and 120 Hz. signals on the comparator circuit.

As should be apparent, a novel generator for an ultrasonic transducer and a circuit for controlling the power output of the generator have been described. The circuits are relatively simple in construction, and therefore economical, but are still capable of providing a relatively constant power output to the transducer over a range of operating frequencies.

What is claimed is:

1. In combination an ultrasonic transducer means whose impedance varies as a function of its loading, oscillator circuit means including amplifying means having at least a control electrode and first and second output electrodes, means for connecting said transducer means in series between a point of reference potential and said first output electrode so that the current through said amplifying means is proportional to the current through said transducer means and a first voltage appears between said first output electrode and said point of reference potential which is proportional to the voltage across said transducer, and means connected to said second output electrode for producing a second voltage proportional to the current through said amplifying means and for applying said second voltage between said control electrode and said point of reference potential so that said first and second voltages are vectorially additive with respect to the operation of said amplifying means.

2. In the combination of claim 1 wherein said three electrode amplifying means is a semiconductor device having an emitter, a collector and a base electrode which are respectively said first and second output electrodes and said control electrode.

3. In the combination of claim 2 wherein said transducer is connected to said emitter electrode and said means for applying the second voltage to said base electrode comprises tuned feedback circuit means connected between the collector and base electrodes.

4. The combination of claim 1 wherein said means for producing said second voltage comprises a resistor means.

5. The combination of claim 2 wherein said means for producing said second voltage comprises resistor means connected between said collector electrode and a source of operating potential.

6. In the combination of claim 3 wherein said transducer is of the piezoelectric type and has the characteristics of a series circuit of inductance, capacitance and resistance.

7. In the combination of claim 1 further comprising means for supplying voltage to said oscillator amplifying means, control means for varying the magnitude of the supply voltage, and means responsive to the current through the transducer for operating said control means.

8. In the combination of claim 7 wherein said control means comprises a voltage comparator circuit, said current responsive means producing a voltage control signal which is proportional to the current through the transducer, and comparing means for setting a reference level voltage and for comparing the reference level voltage with the control voltage, said comparing means producing an output signal when the control voltage exceeds the reference level voltage.

9. In the combination of claim 8 further comprising a control device connected to said comparing means and to a power supply voltage, means connecting said control device as the power supply for the oscillator means, said control device responsive to the output signal of the comparing to vary the voltage from the voltage supplied to the oscillator means in a manner to attempt to maintain a substantially constant current through said transducer.

10. In the combination of claim 8 wherein said comparing means comprises a transistor with the reference level voltage being the inherent voltage drop between two electrodes of the transistor.

11. In the combination of claim 9 wherein said comparing means comprises a transistor with the reference level voltage being the inherent voltage drop between two electrodes of the transistor.

* * * * *